(12) United States Patent
Hoeger

(10) Patent No.: US 11,446,756 B2
(45) Date of Patent: Sep. 20, 2022

(54) SYSTEMS AND METHODS FOR WIRE SURFACE OXIDATION REMOVAL AND/OR WIRE PREHEATING USING A TUNGSTEN ARC

(71) Applicant: ILLINOIS TOOL WORKS INC., Glenview, IL (US)

(72) Inventor: Michael V. Hoeger, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 428 days.

(21) Appl. No.: 16/553,522

(22) Filed: Aug. 28, 2019

(65) Prior Publication Data

US 2020/0070272 A1 Mar. 5, 2020

Related U.S. Application Data

(60) Provisional application No. 62/725,219, filed on Aug. 30, 2018.

(51) Int. Cl.
| | |
|---|---|
| *B23K 9/10* | (2006.01) |
| *B23K 9/133* | (2006.01) |
| *B23K 9/16* | (2006.01) |
| *B23K 9/167* | (2006.01) |
| *B23K 9/173* | (2006.01) |

(52) U.S. Cl.
CPC .......... *B23K 9/1093* (2013.01); *B23K 9/1075* (2013.01); *B23K 9/133* (2013.01); *B23K 9/164* (2013.01); *B23K 9/1675* (2013.01); *B23K 9/173* (2013.01)

(58) Field of Classification Search
CPC ...... B23K 9/235; B23K 9/295; B23K 9/1093; B23K 35/00; B23K 9/1075; B23K 9/164; B23K 9/1675; B23K 9/173
See application file for complete search history.

(56) References Cited

U.S. PATENT DOCUMENTS

| 2014/0008354 A1 | 1/2014 | Pletcher |
| 2015/0209889 A1 | 7/2015 | Peters |
| 2017/0165778 A1 | 6/2017 | Hsu |

(Continued)

FOREIGN PATENT DOCUMENTS

| CN | 1686656 A | 10/2005 | |
| CN | 102000903 | * 7/2012 | ............ B23K 9/167 |
| CN | 102528243 A | 7/2012 | |

(Continued)

OTHER PUBLICATIONS

Machine Translation of Han et al. CN108581156—Performed Dec. 2021 (Year: 2018).*

(Continued)

*Primary Examiner* — Brian W Jennison
(74) *Attorney, Agent, or Firm* — McAndrews, Held & Malloy, Ltd.

(57) ABSTRACT

An apparatus and system for preheating and removing surface oxidation of welding wire using electric arcs one via one or more tungsten electrodes is disclosed. The preheating and cleaning electric arcs may occur between tungsten electrodes, or between one or more tungsten electrodes and welding wire. Electric arc preheating of welding wire allows increased efficiency and deposition rates.

19 Claims, 16 Drawing Sheets

(56) References Cited

U.S. PATENT DOCUMENTS

2018/0099346 A1    4/2018  Zwayer

FOREIGN PATENT DOCUMENTS

| CN | 108581156 | * | 9/2018 | ............ B23K 10/02 |
| EP | 3265263 A1 | | 1/2018 | |

OTHER PUBLICATIONS

Machine Translation of Huang et al. CN102000903—Performed Dec. 2021 (Year: 2012).*
PCT, Notification of Transmittal of the International Search Report and the Written Opinion of the International Searching Authority, or the Declaration, in International Application No. PCT/US2019/049112, dated Nov. 21, 2019 (10 pages).
Ni, Jun, Influence of Preheated Wire on GMAW Process, Advanced Materials Research, ISSN: 1662-8985, vol. 668, pp. 538-542, doi: 10.4028/www.scientific.net/AMR.668.538, Trans Tech Publications, Switzerland, Online: Mar. 11, 2013 (5 pages).
Ni, Jun, Effect of the Wire Temperature on the Weld Fomation in GMAW, Advanced Materials Research, ISSN: 1662-8985, vols. 652-654, pp. 2289-2292, doi: 10.4028/www.scientific.net/AMR.652-654.2289, Trans Tech Publications, Switzerland, Online: Jan. 25, 2013 (4 pages).

* cited by examiner

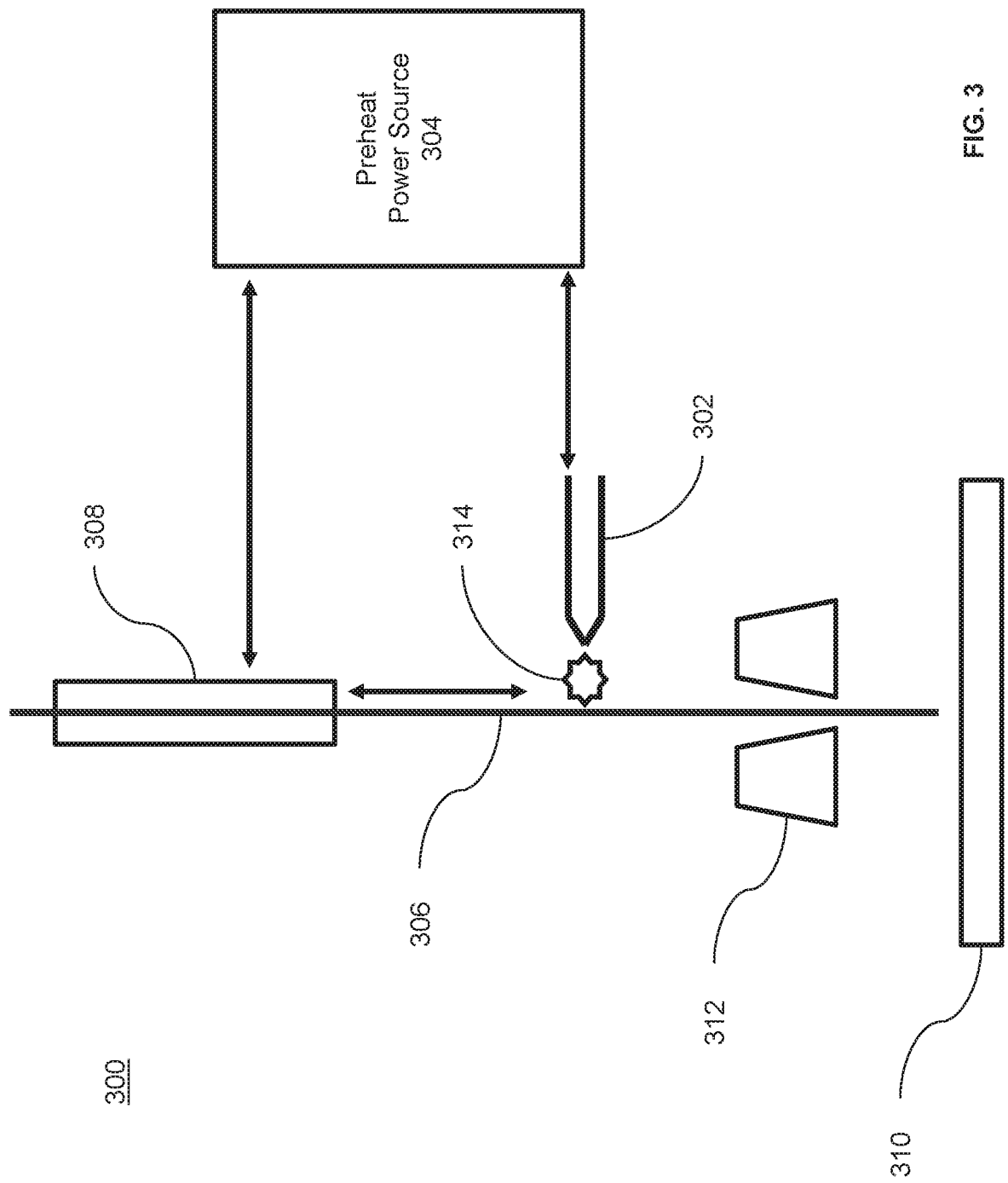

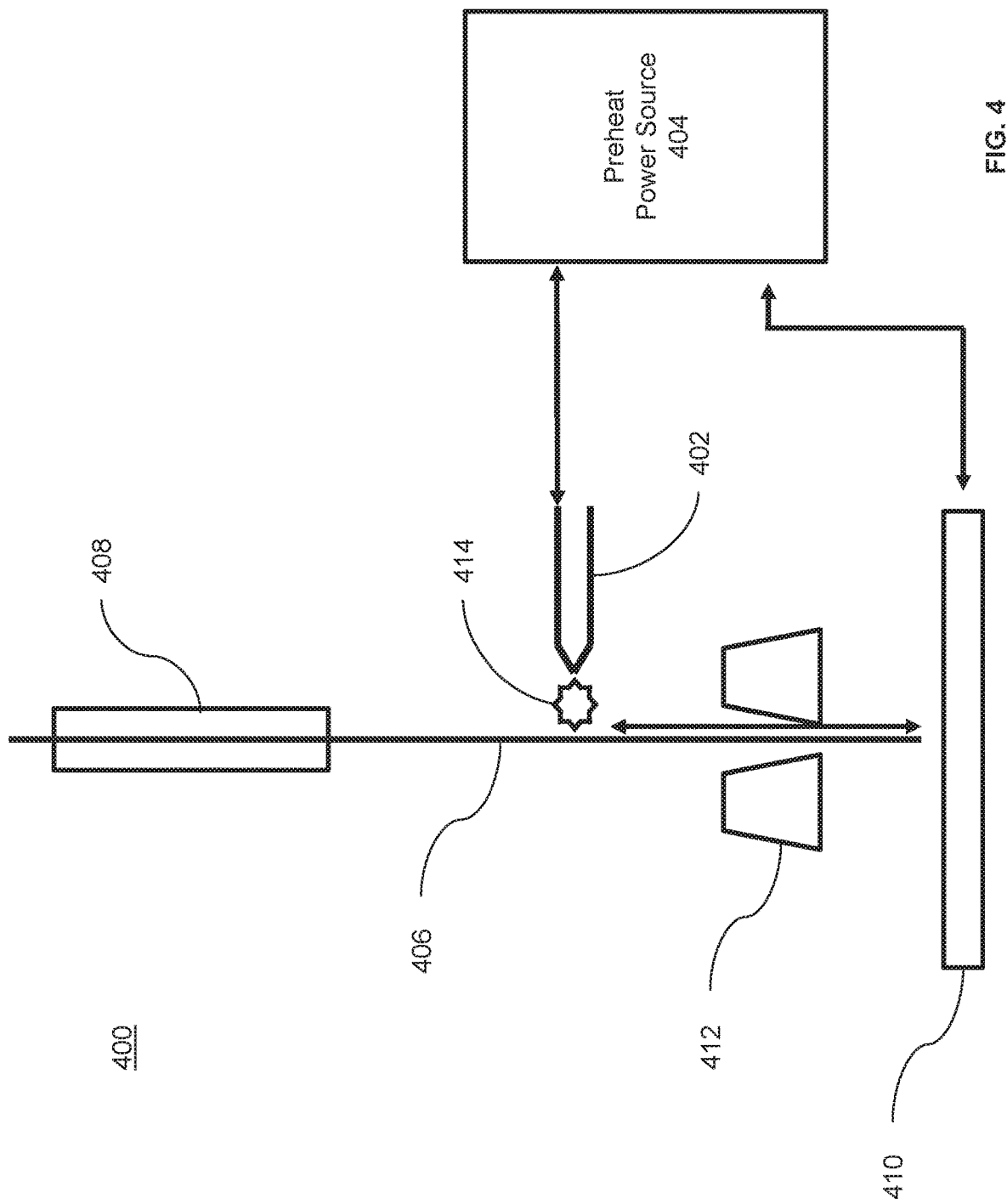

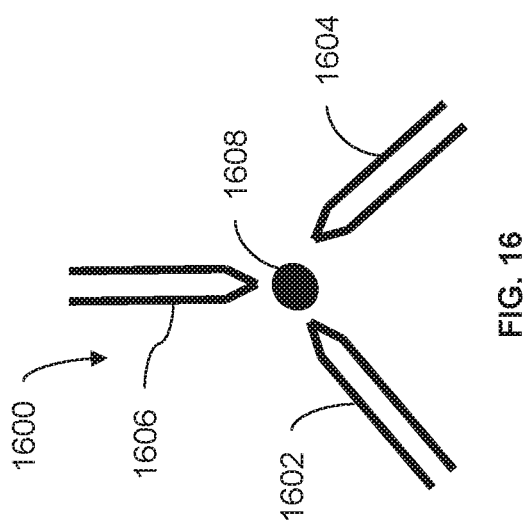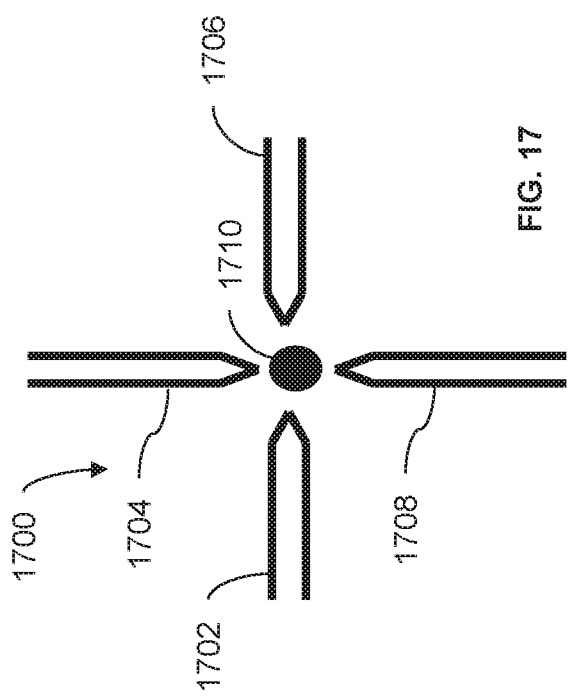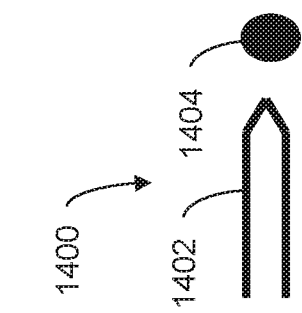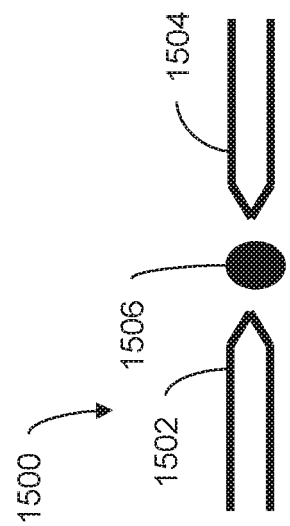

SYSTEMS AND METHODS FOR WIRE SURFACE OXIDATION REMOVAL AND/OR WIRE PREHEATING USING A TUNGSTEN ARC

CROSS REFERENCE TO RELATED APPLICATIONS

The present application claims the benefit of U.S. Provisional Patent Application Ser. No. 62/725,219 filed Aug. 30, 2018, entitled "SYSTEMS AND METHODS FOR WIRE SURFACE OXIDATION REMOVAL AND/OR WIRE PREHEATING USING A TUNGSTEN ARC." The entire contents of U.S. Provisional Patent Application Ser. No. 62/725,219 are expressly incorporated herein by reference.

BACKGROUND

The present disclosure relates to welding systems and, more particularly, to systems and methods for wire surface oxidation removal and/or wire preheating using a tungsten arc.

Welding is a process that has increasingly become ubiquitous in all industries. A wide range of welding systems and welding control regimes have been implemented for various purposes. In continuous welding operations, gas metal arc welding (GMAW) and submerged arc welding (SAW) techniques allow for formation of a continuing weld bead by feeding welding wire shielded by inert gas from a welding torch. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

The present disclosure relates to welding systems and, more particularly, to systems and methods for wire surface oxidation removal and/or wire preheating using a tungsten arc, substantially as illustrated by and described in connection with at least one of the figures, as set forth more completely in the claims.

BRIEF DESCRIPTION OF THE DRAWINGS

FIG. 3 is a block diagram of an electric arc preheating system, in which current flows through a wire between an electric arc and a contact tip, in accordance with aspects of this disclosure.

FIG. 4 is a block diagram of an electric arc preheating system, in which current flows through a wire between an electric arc and a workpiece, in accordance with aspects of this disclosure.

FIG. 14 is an illustration of an example arrangement of an electric arc preheating system using a single tungsten electrode.

FIG. 15 is an illustration of an example arrangement of an electric arc preheating system using two tungsten electrodes.

FIG. 16 is an illustration of an example arrangement of an electric arc preheating system using three tungsten electrodes.

FIG. 17 is an illustration of an example arrangement of an electric arc preheating system using four tungsten electrodes.

The figures are not necessarily to scale. Where appropriate, similar or identical reference numbers are used to refer to similar or identical components.

DETAILED DESCRIPTION

Figure 1:
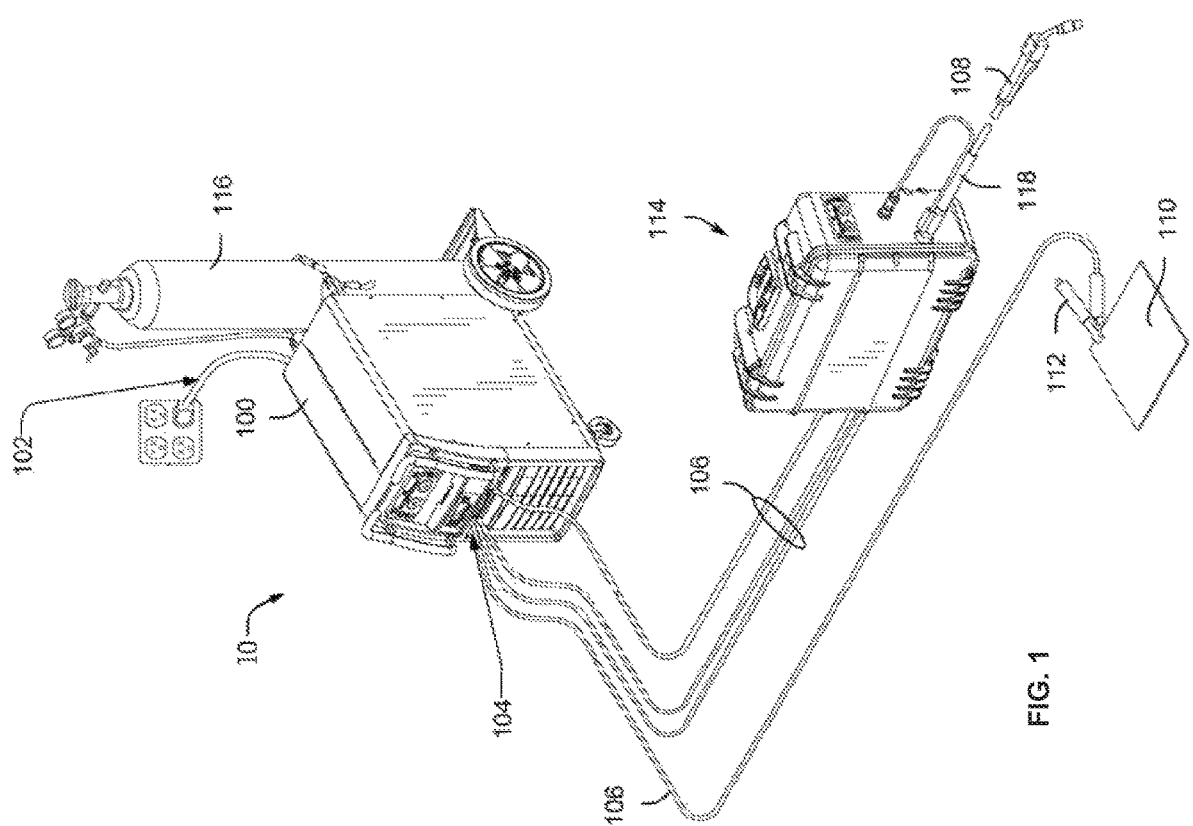
FIG. 1 is an illustration of an example welding-type system in accordance with aspects of this disclosure.

In some welding applications, it is desirable to preheat the welding wire before the welding wire is deposited onto a workpiece. Preheating the welding wire can result in one or more advantages, such as reducing the heat to be applied to the workpiece via the welding arc, increasing deposition rates, and/or reducing hydrogen present in the weldment. For example, in systems in which welding wire is not preheated, the power from the welding arc must be sufficient to both melt the base material and the ambient temperature welding wire. Systems where welding wire is not preheated therefore may suffer from a low deposition rate and/or a low thermal efficiency. This low deposition rate and efficiency is due in part by the low energy transfer efficiency between the welding arc and the desired heated materials (i.e., a workpiece). Additionally, in systems in which the welding wire is a filler material, excess energy is transferred to the workpiece, so that the weld pool has sufficient energy to melt the incoming filler. This excess energy is readily extracted from the desired location of heat application due to the high thermal diffusivity nature of metals. Addition of excess energy is undesirable as the increased temperature can: produce distortion, alter the metallurgical properties, increase atmospheric oxidation, and/or reduce efficiency of the welding electrical power.

Conventional preheating methods use Joule, or resistive, preheating. Direct Joule heating is the application of a high current to a segment of the filler wire. Direct Joule heating can be performed by transferring current from work through the wire to a contact tip or through a contact tip through the wire to another contact tip. Disadvantages of direct Joule heating include: the need for large gauge cables to carry the wire segment heating current; high energy losses if the welding wire segment being heated is electrically conductive; and work to wire heating can create undesirable arcing and sparking which must be arrested by the power source. A method to improve Joule heating is to decrease wire diameter and increase wire feed speed to maintain the high deposition rates. Increasing wire feed speed is practical only to the point where processes can be stopped or corrected on a human timescale. If the wire has insufficient heat to melt, a bird nest of hot wire can form around the welding torch. If the wire has excess heat, the wire can "burn back" in which case sparking and arcing is created, and material is not deposited where desired. Direct Joule heat is better suited to higher-resistance alloys.

Electric arc wire heating is the application of an electrical arc to the welding wire. For example, one or more nonconsumable electrodes (e.g., tungsten or tungsten-alloy electrodes) may be used to create an arc between the nonconsumable electrode and the welding wire. The power delivered via the arc preheats the welding wire to a desired temperature. An advantage of electric arc wire heating over Joule heating is the current requirement reduction. The arc voltage drop appreciably decreases both the current requirement and the subsequent cable/connection losses attributed with high current applications. Since the heat generation is primarily from the arc, the electrical conductivity of the filler wire does not have a significant role in overall system efficiency. Electric arc wire heating therefore maintains similar performance for all material types. The arc is stable at small arc lengths and slow wire feed speeds. The present disclosure relates to apparatus, systems, and methods of using electrical arc(s) to preheat welding wire.

Additionally, the disclosed preheating system achieves a greater deposition rate as compared to cold wire welding, or conventional preheating systems. For example, TIG welding using the disclosed electric arc preheating system can achieve deposition rates of 200 inches per minute using 0.063 gauge wire. Currently, cold wire TIG welding achieves a deposition rate of 12 inches per minute using a 0.63 gauge wire.

An additional advantage of the present disclosure is that electrical arc(s) can be used to remove the oxide layer of aluminum welding wire. Aluminum is highly reactive, and forms a surface oxide layer when exposed to atmospheric conditions. The oxide layer contains significant amounts of water from atmospheric humidity. The water provides a source of hydrogen, which can cause porosity in an aluminum weld. Therefore, it is advantageous to remove the oxide layer and prevent the re-formation of the oxide layer after cleaning. Accordingly, the electric arc(s) of the present disclosure may be configured to remove the oxide layer of aluminum welding (as well as any other surface contaminant). Shielding gas is provided to prevent the re-formation of the oxide layer on the aluminum welding wire.

Additionally, the electric arcs of the disclosed preheating system removes organic contaminants from welding wire during the preheating process. Removing organic contaminants prevents weld defects caused by "dirty" welding wire, which can include porosity in the weld.

Additionally, the disclosed preheating system can be retrofit into existing welding guns/torches. Existing welding torches may be modified to include one or more tungsten electrodes configured to preheat welding wire via arc preheating.

Disclosed apparatus for preheating welding wire include a first tungsten electrode and a second tungsten electrode configured to preheat welding wire via electric arc preheating.

In some apparatus for preheating welding wire, the first tungsten electrode is offset circumferentially from the second tungsten electrode, and welding wire is fed generally between the first tungsten electrode and the second tungsten electrode In some apparatus for preheating welding wire, electric arc preheating includes an electric arc between the first tungsten electrode and the second tungsten electrode.

In some apparatus for preheating welding wire, the electric arc between the first tungsten electrode and the second tungsten electrode is an alternating current electric arc.

Some apparatus for preheating welding wire further include a first electric arc between the first tungsten electrode and the welding wire and a second electric arc between the second tungsten electrode and the welding wire.

Some apparatus for preheating welding wire further include a contact tip electrically connected to the welding wire, and wherein the contact tip is electrically connected to a preheating power source.

In some apparatus for preheating welding wire, both the first tungsten electrode and the second tungsten electrode have a positive polarity with respect to the welding wire.

Some apparatus for preheating welding wire further include a first region including shielding gas, and the electric arc preheating occurs within the first region.

Some apparatus for preheating welding wire further include: a wire guide configured to deliver preheated welding wire from the first region to a workpiece; and a gas diffuser configured to diffuse shielding gas around the preheated welding wire delivered to the workpiece.

Some apparatus for preheating welding wire further include a nozzle configured to diffuse shielding gas around the preheated welding wire.

Disclosed systems for preheating welding wire include: a power source; a first tungsten electrode electrically connected to the power source; and a second tungsten electrode electrically connected to the power source, and the first tungsten electrode and the second tungsten electrode are configured to preheat welding wire via electric arc preheating.

In some systems for preheating welding wire, the first tungsten electrode is offset circumferentially from the second tungsten electrode, and welding wire is fed generally between the first tungsten electrode and the second tungsten electrode.

In some systems for preheating welding wire, electric arc preheating includes an electric arc between the first tungsten electrode and the second tungsten electrode.

In some systems for preheating welding wire, the electric arc between the first tungsten electrode and the second tungsten electrode is an alternating current electric arc.

Some systems for preheating welding wire further include a first region comprising shielding gas, wherein the electric arc preheating occurs within the first region.

Disclosed systems for preheating welding wire include: a first power source; a second power source; a first tungsten electrode electrically connected to the first power source; and a second tungsten electrode electrically connected to the second power source; and the first tungsten electrode and the second tungsten electrode are configured to preheat welding wire via electric arc preheating.

In some system for preheating welding wire, electric arc preheating includes: a first electric arc between the first tungsten electrode and the welding wire; and a second electric arc between the second tungsten electrode and the welding wire.

Some systems for preheating welding wire further include a contact tip electrically connected to the welding wire, the contact tip being electrically connected to the first power source and the second power source.

In some systems for preheating welding wire, the first power source provides positive direct current power to the first tungsten electrode, and the second power source provides positive direct current power to the second tungsten electrode.

Some systems for preheating welding wire further include a first region comprising shielding gas, the electric arc preheating occurring within the first region.

FIG. 1 illustrates an exemplary welding-type system 10 including a welding power source 100. A source of power is provided to the welding power source 100 via an AC power cord 102. Typical ranges of AC power may be 115/230 VAC or 208-575 VAC, and may include single-phase or three-phase power. The welding power source 100 generally supplies power for the welding-type system 10. Weld output 104 provides welding output power via one or more weld cables 106 coupled to a modified welding torch 108 and a workpiece 110 using a clamp 112. Welding output power may be in the range of 10 Amps to 600 Amps or more, and range from 0 volts at short circuit to 44 volts or more into an open welding arc. Modern welding power sources and systems can provide welding type power for various weld processes which may include advanced waveform generation and control that is responsive to dynamic or static conditions at the welding arc.

The illustrated welding type system 10 includes a wire feeder 114 and a gas supply 116. The welding power source 100 may provide power and control to other equipment such as a wire feeder 114. In the illustrated example, the modified welding torch 108 is coupled to the wire feeder 114 via coupler 118 in order to supply welding wire, shielding gas from the gas supply 116, and/or welding-type power to the welding torch 108 during operation of the welding-type system 10. In some examples, the welding power source 100 may couple and/or directly supply welding-type power to the welding torch 108.

As described in more detail below, the welding torch 108 is configured to preheat welding wire via electric arc preheating. The welding torch 108 contains one or more tungsten electrodes which preheat the fed welding wire via arc wire heating. In the welding type system 100, the one or more tungsten electrodes are connected to the welding power supply 100 to provide preheating power, and/or to a separate source of preheating power. As explained in more detail below, in some examples, the one or more tungsten electrodes in the welding torch 108 may be connected to one or more dedicated preheating power sources.

The example welding-type system 10 of FIG. 1 has been described as a GMAW system, but the preheating system as disclosed can also be used, for example, to preheat Gas Tungsten Arc Welding ("GTAW") filler wire. For example, the modified welding torch 108 may provide preheated welding filler wire for GTAW processes, flux-cored welding processes, submerged arc welding (SAW) processes, tandem welding processes, laser welding processes, hybrid welding processes, pulsed welding process, spray welding processes and/or any other processes involving adding wire filler metals. The preheating system may also be used to preheat wire electrode for deposition into a weld puddle in addition to conventional GMAW arc and electrode deposition, as a leading or trailing wire electrode deposition system. In some examples, a die may be provided to curl preheated welding wire from the welding torch into a weld pool on the workpiece.

Figure 2A:
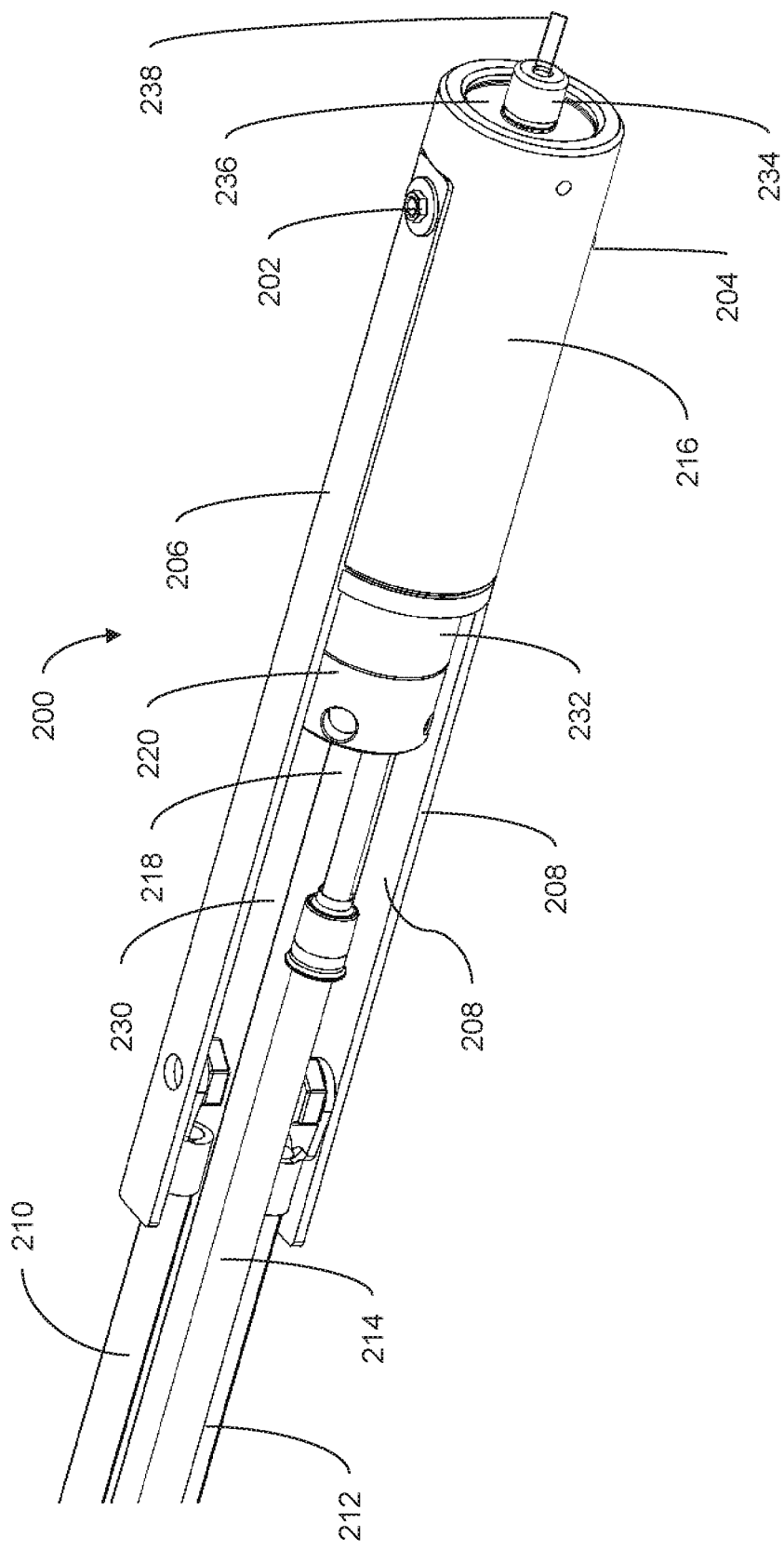
FIG. 2a is an illustration of an isometric view of a welding torch configured to preheat welding wire via electric arc preheating.
Figure 2B:
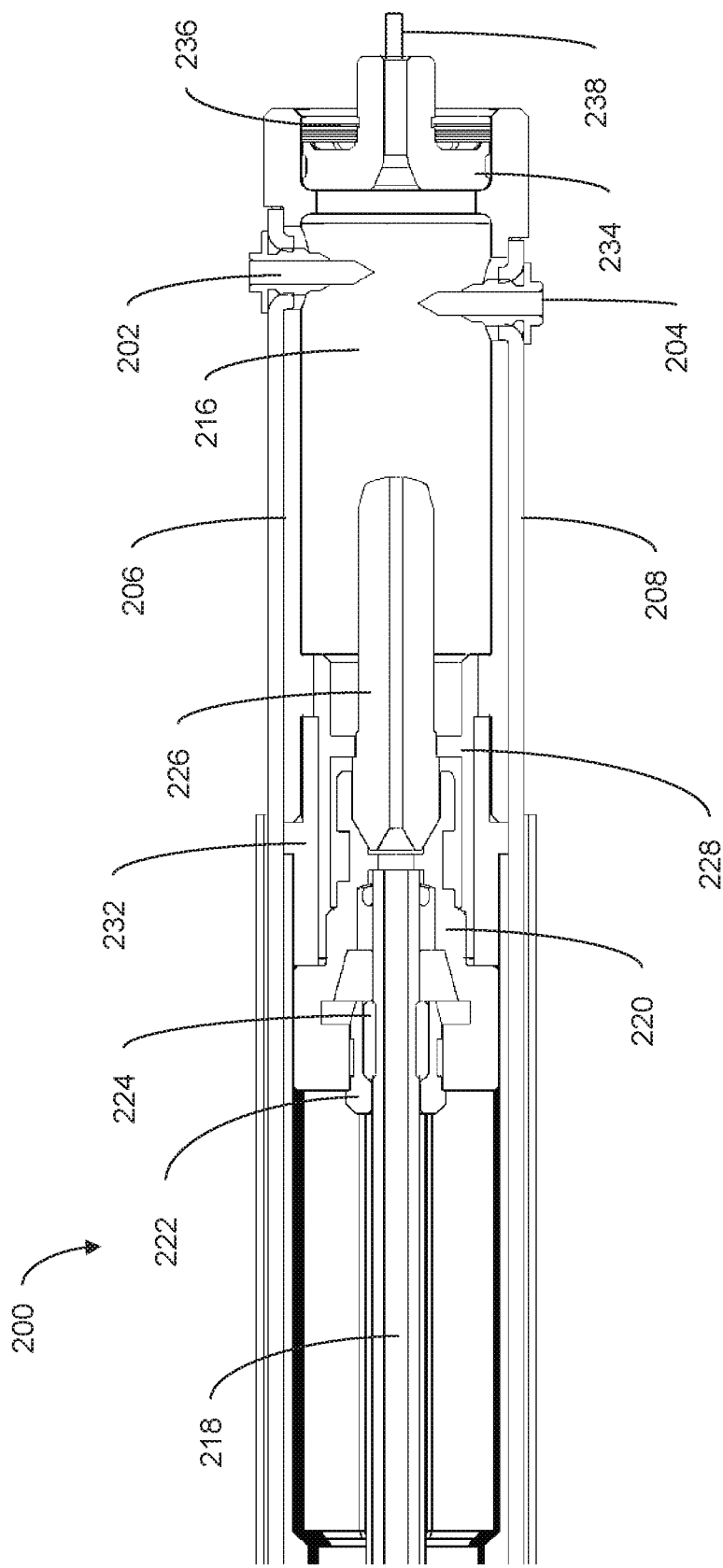
FIG. 2b is an illustration of a cross-sectional view of the welding torch of FIG. 2a, configured to preheat welding wire via electric arc preheating.

FIG. 2a shows an illustration of an isometric view of an example metal inert gas ("MIG") welding torch 200 configured to preheat welding wire. FIG. 2b shows a cross sectional view of the MIG welding torch 200. The handle of the MIG welding torch 200 is not shown in FIGS. 2a and 2b. The welding torch 200 includes a first tungsten electrode 202 and a second tungsten electrode 204. As shown, the first tungsten electrode 202 and the second tungsten electrode 204 are offset circumferentially. Although FIGS. 2a and 2b illustrate a welding torch with two preheating tungsten electrodes, a welding torch may also be fitted with a single preheating tungsten electrode, or three or more preheating tungsten electrodes. The first tungsten electrode 202 is connected to a first electric bus 206, and the second tungsten electrode 204 is connected to a second electric bus 208. The first electric bus 206 is connected to a power source via a first power cable 210, and the second electric bus is connected to a power source via a second power cable 212. The welding torch 200 is supplied with shielding gas via shielding gas hose 214.

The first tungsten electrode 202 and the second tungsten electrode 204 terminate in a chamber 216. The example chamber 216 is a ceramic tube, but may be another type of chamber configured to contain shielding gas adjacent the electrode wire traveling through the welding torch 200. The chamber 216 is supplied with shielding gas via the shielding gas hose 214. Welding wire is fed to the welding torch 200 via a wire liner 218. The wire liner 218 is connected to a connection block 220 via wire liner holder 222 and threaded wire liner holder 224. Fed welding wire enters a contact tip 226 from the wire liner 218, and then enters the chamber 216 via the contact tip 226. The contact tip 226 is connected to the connection block 220 via contact tip holder 228. The connection block 220 is connected to the preheating power source via a third power cable 230, which completes the circuit between the preheating power source, the tungsten electrodes 202 and 204, and the welding wire. An insulator 232 insulates the connection block 220 from the first electric bus 206 and the second electric bus 208. Preheated welding wire 238 exits the chamber 216 via a wire guide 234. Gas diffuser screens 236 diffuse shielding gas around the preheated welding wire 238 that exits the chamber 216 via the wire guide 234. In some examples, gas diffuser screen 236 diffuses shielding gas received from the chamber 216. In some examples, gas diffuser screen is connected to a gas supply, for example gas supply 116 of FIG. 1, via a dedicated shielding gas hose (not shown). Welding wire is preheated inside the chamber 216 via electric arc preheating via arcs generated between the tungsten electrodes 202 and 204 and the electrode wire. As described in more detail below, in some examples, each tungsten electrode 202 and 204 is connected to a dedicated power source. In some examples, each tungsten electrode is connected to the same power source. In some examples, the preheating power source is implemented using the same power source that provides the welding current (e.g., the welding current supplying the arc between the welding wire and a workpiece).

Although FIGS. 2a and 2b illustrate a chamber 216, the electric arc preheating may occur in any region supplied with shielding gas, for example via a nozzle or gas diffuser.

As described in more detail below, in some examples preheating arcs may be between each tungsten electrode 202 and 204 and the welding wire. In such examples, the welding wire is connected to the preheating power source(s), or otherwise completes a preheating circuit, via the contact tip 226. For example, the contact tip 226 is electrically coupled to a different terminal of the preheating power supply such that the tungsten electrode(s) 202, 204, the arc(s), the welding wire, the contact tip 226, and the preheating power supply form a preheating circuit (using appropriate electrical leads between the contact tip 226 and the preheating power supply and between the tungsten electrode(s) 202, 204 and the preheating power supply). FIGS. 3-13 illustrate example preheating circuits, which may or may not include the contact tip 226. In some examples, the preheating arc may be between the first tungsten electrode 202 and the second tungsten electrode 204. In such examples, preheating current does not return to the preheating power source(s) via the welding wire.

The distance between the tungsten electrodes (202 and 204) and the welding wire is approximately 0.5 millimeters. In some examples, the positions of the tungsten electrodes 202 and 204 are adjustable. More specifically, the distance between the tungsten electrodes 202 and 204 and the welding wire is adjustable in order to accommodate different sizes of welding wire and/or to adjustments of the preheating arc voltage.

Further, one or both of the tungsten electrodes 202 and 204 may be set to be electrode positive. Arcs using electrode positive polarity (e.g., the tungsten electrodes 202, 204 have a positive voltage relative to the electrode wire) more readily remove oxidation layers on aluminum welding wire compared to electrode negative polarity. Preheating aluminum welding wire with an electrode positive arc therefore removes the oxidation layer from the aluminum welding wire. The first tungsten electrode 202 and the second tungsten electrode 204 may be offset circumferentially in order to remove the oxide layer from both sides of the welding wire, as well as to evenly preheat the welding wire. In some examples, the electrodes may be connected to alternating current power sources. When connected to alternating current power sources, the electric arc(s) between the tungsten electrodes 202 and 204 will have a positive component, and the positive component removes the surface oxidation of aluminum welding wire. To remove surface oxidation from aluminum welding wire, tungsten electrodes 202 and 204 can be connected to a power source with a positive time component.

The chamber 216 is filled with inert shielding gas to prevent the re-oxidation of cleaned aluminum welding wire. In some examples, as explained below the welding wire may not be preheated inside of a chamber 216. In some such examples, a nozzle may provide inert shielding gas to the preheated and cleaned aluminum welding wire to prevent the re-oxidation of the aluminum welding wire. Additionally or alternatively, the chamber 216 may include a nozzle portion (e.g., a taper at an end of the chamber 216 closest to the welding arc) to focus shielding gas flow toward the weld puddle.

FIG. 3 is a block diagram of an exemplary electric arc preheating system 300, embodied, for example, in the welding torch 200 of FIGS. 2a and 2b. Preheating system 300 includes a single preheating tungsten electrode 302. The tungsten electrode 302 is electrically connected to a preheating power source 304. Welding wire 306 is fed through a contact tip 308 and delivered to a workpiece 310 via a wire guide 312. The contact tip 308 is electrically connected to the power source 304 in order to complete a circuit between the power source 304, the tungsten electrode 302, and the welding wire 306. The welding wire 306 is preheated by an electric arc 314 between the tungsten electrode 302 and the welding wire 306. The tungsten electrode 302 is positioned between the contact tip 308 and the wire guide 312. As explained with reference to FIGS. 2a and 2b, the electric arc 314 may occur inside of a chamber or other region filled with shielding gas in order to prevent oxidation of the welding wire 306.

FIG. 4 is a block diagram of an exemplary electric arc preheating system 400, embodied, for example, in the welding torch 200 of FIGS. 2a and 2b. Preheating system 400 includes a single preheating tungsten electrode 402. The tungsten electrode 402 is electrically connected to a preheating power source 404. Welding wire 406 is fed through a contact tip 408 and delivered to a workpiece 410 via a wire guide 412. The workpiece 410 is electrically connected to the power source 404 in order to complete a circuit between the power source 404, the tungsten electrode 402, and the welding wire 406. The welding wire 406 is preheated by an electric arc 414 between the tungsten electrode 402 and the welding wire 406. The tungsten electrode 402 is positioned between the contact tip 408 and the wire guide 412. As explained with reference to FIGS. 2a and 2b, the electric arc 414 may occur inside of a chamber or other region filled with shielding gas in order to prevent oxidation of the welding wire 406.

Figure 5:
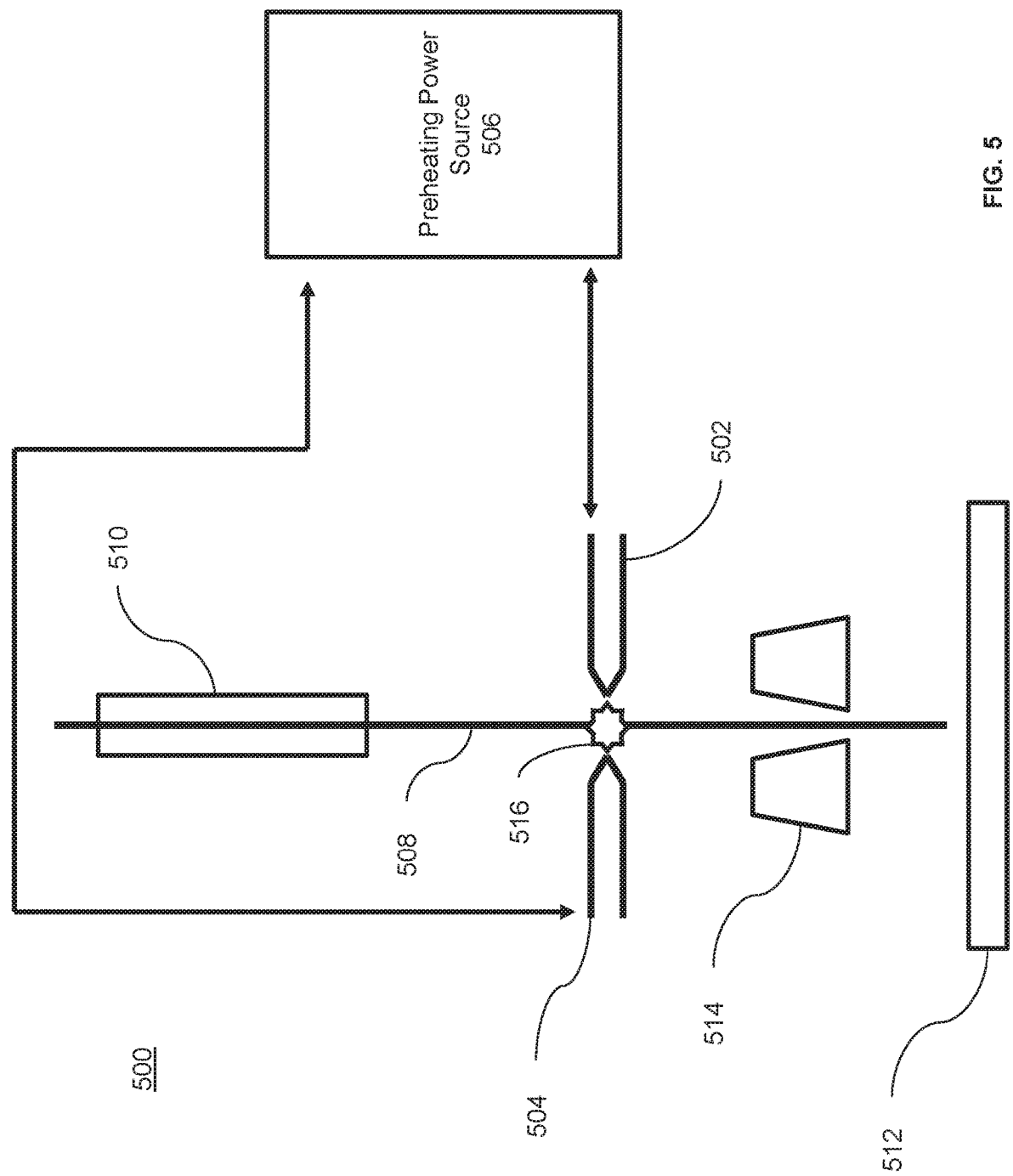
FIG. 5 is a block diagram of an electric arc preheating system, in which an electric arc occurs between two tungsten electrodes, in accordance with aspects of this disclosure.

FIG. 5 is a block diagram of an exemplary electric arc preheating system 500, embodied, for example, in the welding torch 200 of FIGS. 2a and 2b. Preheating system 500 includes a first tungsten electrode 502 and a second tungsten electrode 504. Each tungsten electrode 502 and 504 is electrically connected to the preheating power source 506. Welding wire 508 is fed through a contact tip 510 and delivered to a workpiece 512 via a wire guide 514. In some examples, the welding wire 508 is preheated by an electric arc 516 directly between the first tungsten electrode 502 and the second tungsten electrode 504, through which the welding wire 508 passes. In some examples, the electric arc 516 includes a first arc from the first tungsten electrode 502 to the welding wire 508, and a second arc from the welding wire 508 to the second tungsten electrode 504, or vice versa. The tungsten electrodes 502 and 504 are positioned between the contact tip 510 and the wire guide 514. As explained with reference to FIGS. 2a and 2b, the electric arc 516 may occur inside of a chamber filled with shielding gas in order to prevent oxidation of the welding wire 508.

Figure 6:
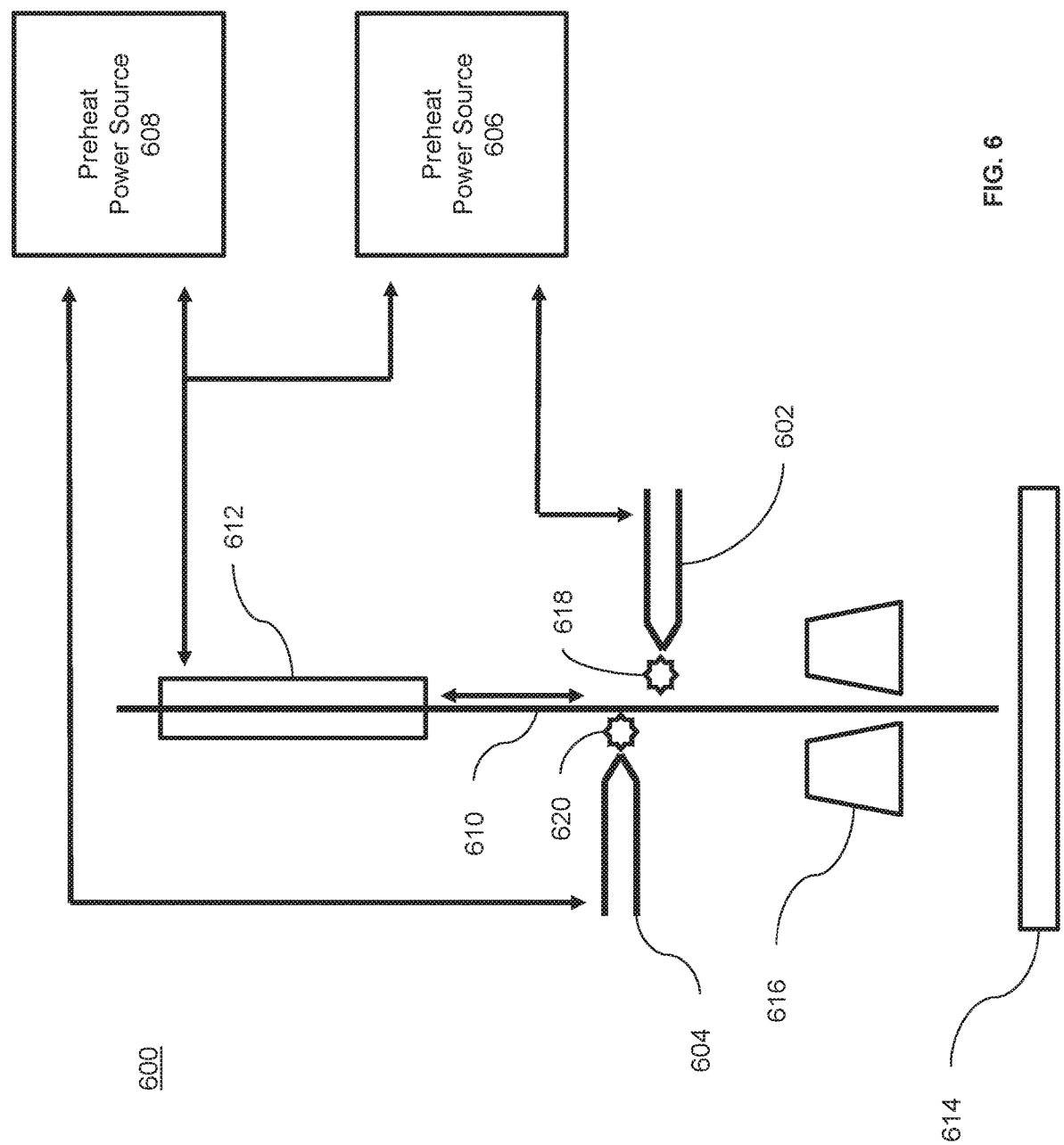
FIG. 6 is a block diagram of an electric arc preheating system including two tungsten electrodes that are each connected to a corresponding preheating power source, in accordance with aspects of this disclosure.

FIG. 6 is a block diagram of an exemplary electric arc preheating system 600, embodied, for example, in the welding torch 200 of FIGS. 2a and 2b. Preheating system 500 includes a first tungsten electrode 602 and a second tungsten electrode 604. The first tungsten electrode 602 is electrically connected to a first preheating power source 606, and the second tungsten electrode 604 is electrically connected a second preheating power source 608. Welding wire 610 is fed through a contact tip 612 and delivered to a workpiece 614 via a wire guide 616. The contact tip 612 is electrically connected to the first preheating power source 606 and the second preheating power source 608 in order to complete the circuits between: 1) the first preheating power source 606, the first tungsten electrode 602, and the welding wire 610; and 2) the second preheating power source 608, the second tungsten electrode 604, and the welding wire 610. Welding wire 610 is preheated by an electric arc 618 between the first tungsten electrode 602 and the welding wire 610 and an electric arc 620 between the second tungsten electrode 604 and the welding wire 610. The tungsten electrodes 602 and 604 are positioned between the contact tip 612 and the wire guide 616. As explained with reference to FIGS. 2a and 2b, the electric arcs 618 and 620 may occur inside of a chamber filled with shielding gas in order to prevent re-oxidation of the welding wire 610.

Figure 7:
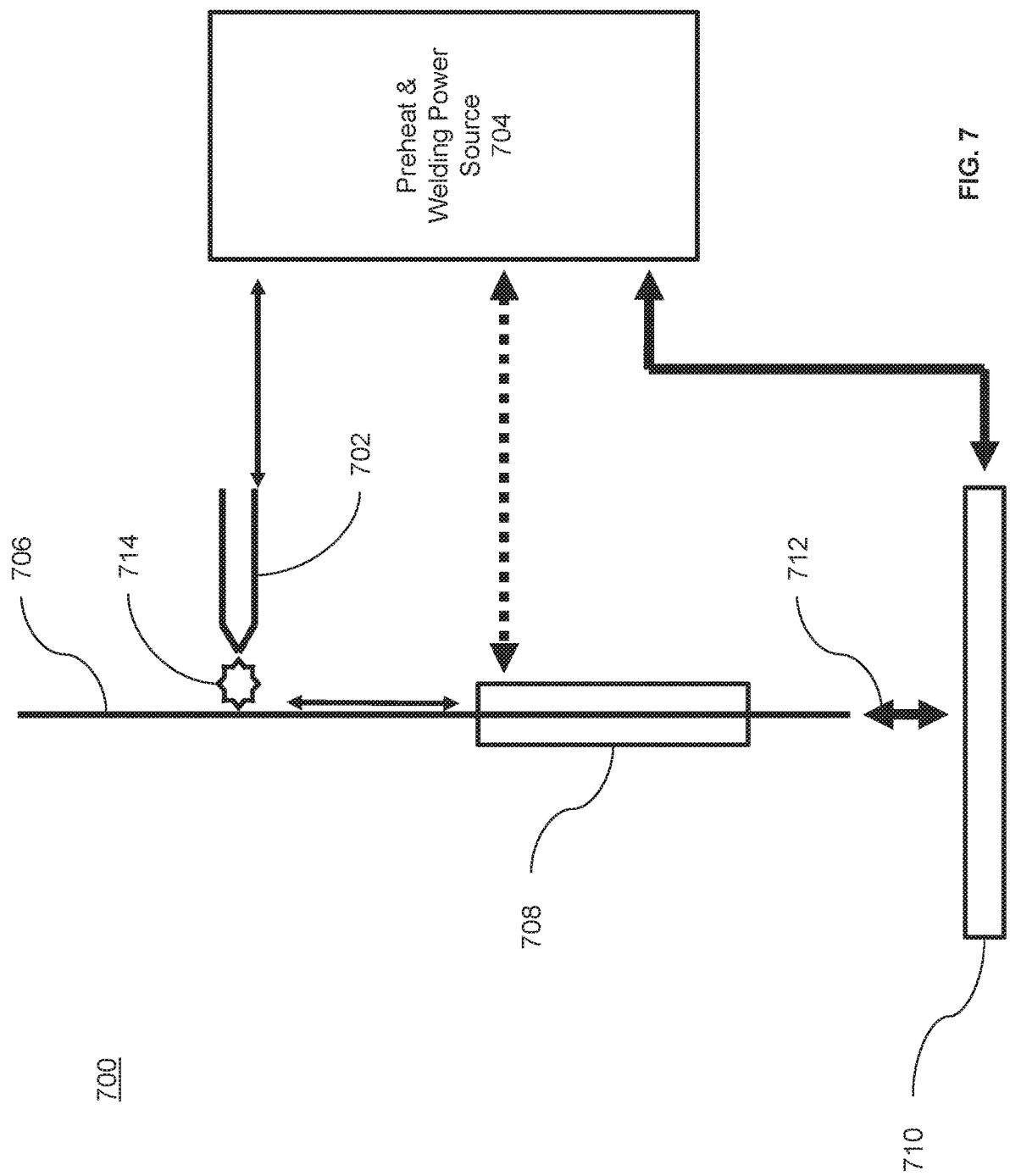
FIG. 7 is a block diagram of an electric arc preheating system, in which current flows through a wire between an electric arc and a workpiece, and in which the preheating power source is also a welding power source, in accordance with aspects of this disclosure.

FIG. 7 is a block diagram of an exemplary electric arc preheating system 700. Preheating system 700 includes a single preheating tungsten electrode 702. The tungsten electrode 702 is electrically connected to a preheating power source 704. The preheating power source 704 is also a welding power source which provides welding power for a welding arc 712 between welding wire 706 and a workpiece 710. Welding wire 706 is fed through a contact tip 708 and delivered to a workpiece 710. The contact tip 708 is connected to the welding power source 704 in order to provide power for a welding arc 712 between the welding wire 706 and the workpiece 710. The workpiece 710 is electrically connected to the power source 704 in order to complete the circuits between: 1) the power source 704, the tungsten electrode 702, and the welding wire 706; and 2) the power source 704, the contact tip 708, and the welding wire 706. The welding wire 706 is preheated by an electric arc 714 between the tungsten electrode 702 and the welding wire 706. The tungsten electrode 702 is positioned before the contact tip 708 (i.e., the welding wire 706 is preheated upstream of the contact tip). Preheating upstream of the contact tip may be advantageous in MIG welding systems, as welding power may be provided to the preheated welding wire 706 at the contact tip 708 in order to form a welding arc 712 between the welding wire 706 and the workpiece 710.

Figure 8:
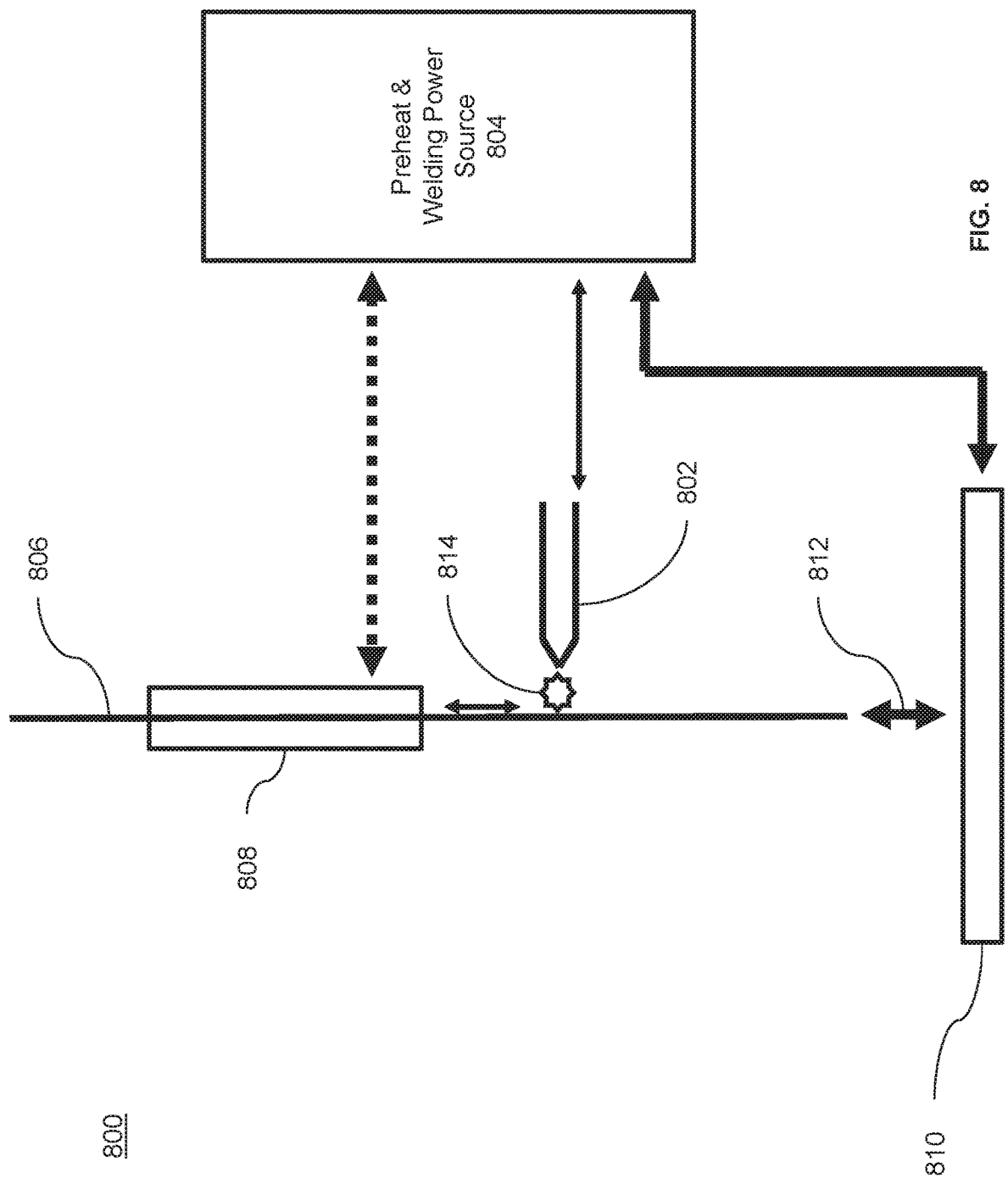
FIG. 8 is a block diagram of an electric arc preheating system, in which current flows through a wire between an electric arc and a contact tip, and in which the preheating power source is also the welding power source, in accordance with aspects of this disclosure.

FIG. 8 is a block diagram of an exemplary electric arc preheating system 800. Preheating system 800 includes a single preheating tungsten electrode 802. The tungsten electrode 802 is electrically connected to a preheating power source 804. The preheating power source 804 is also a welding power source which provides welding power which provides power for a welding arc 812 between welding wire 806 and a workpiece 810. Welding wire 806 is fed through a contact tip 808 and delivered to a workpiece 810. The contact tip 808 is connected to the welding power source 804 in order to provide power for a welding arc 812 between the welding wire 806 and the workpiece 810. The workpiece 810 is electrically connected to the power source 804 in order to complete the circuits between: 1) the power source 804, the tungsten electrode 802, and the welding wire 806; and 2) the power source 804, the contact tip 808, and the welding wire 806. The welding wire 806 is preheated by an electric arc 814 between the tungsten electrode 802 and the welding wire 806. Current returns to the power source 804 via the workpiece 810. The tungsten electrode 802 is positioned after the contact tip 808 (i.e., the welding wire 806 is preheated downstream of the contact tip 808).

Figure 9:
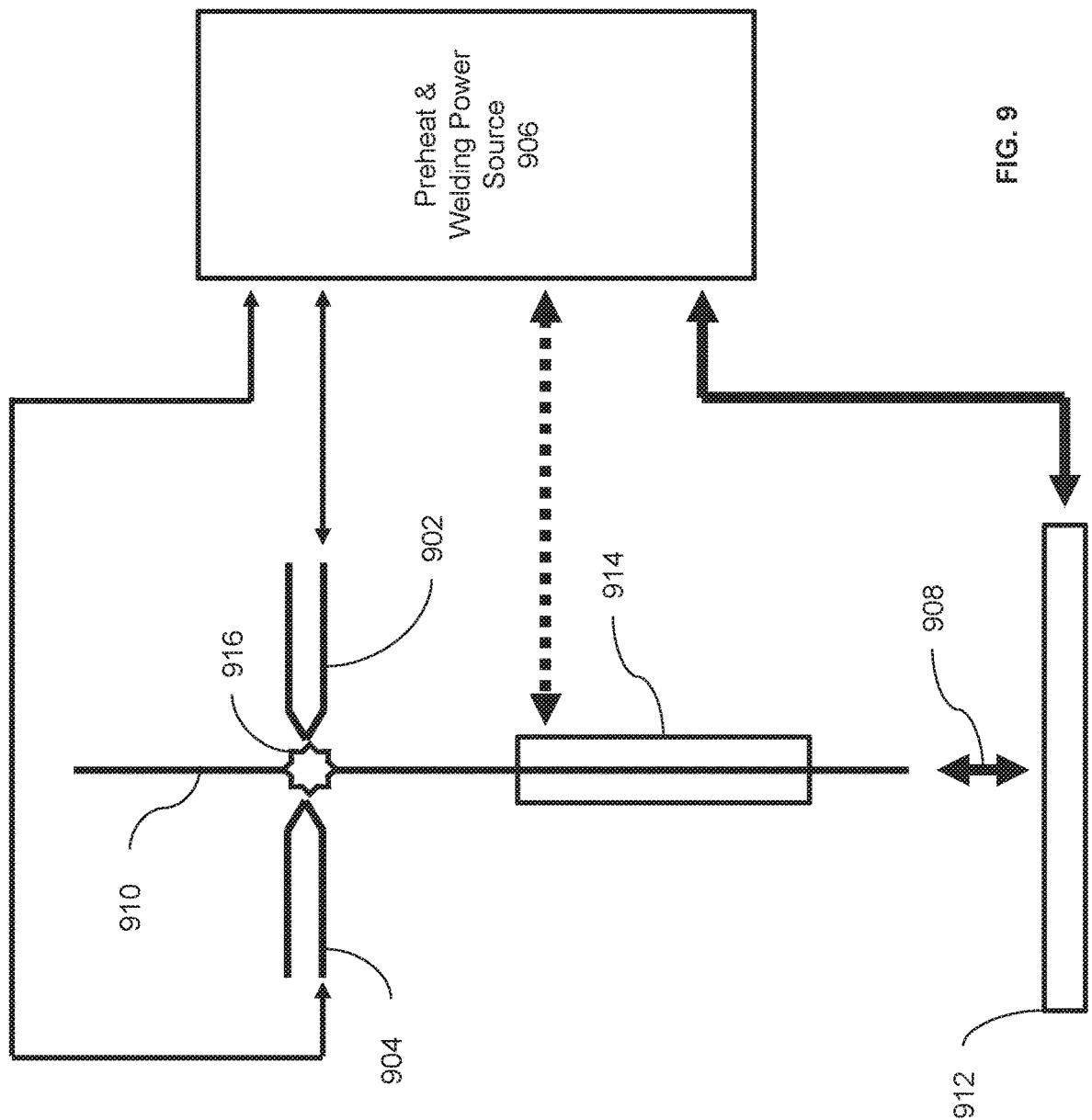
FIG. 9 is a block diagram of an electric arc preheating system, in which an electric arc occurs between two tungsten electrodes upstream of a contact tip, and in which the preheating power source is also a welding power source, in accordance with aspects of this disclosure.

FIG. 9 is a block diagram of an exemplary electric arc preheating system 900. Preheating system 900 includes a first tungsten electrode 902 and a second tungsten electrode 904. Each tungsten electrode 902 and 906 is electrically connected to the preheating power source 906. The preheating power source 906 is also a welding power source which provides welding power which provides power for a welding arc 908 between welding wire 910 and a workpiece 912. Welding wire 910 is fed through a contact tip 914 and delivered to a workpiece 912. The contact tip 914 is connected to the welding power source 906 in order to provide power for a welding arc 908 between the welding wire 910 and the workpiece 912. The workpiece 912 is electrically connected to the power source 906 in order to complete a circuit between the power source 906, the contact tip 914, and the welding wire 910. In some examples, the welding wire 910 is preheated by an electric arc 916 between the first tungsten electrode 902 and the second tungsten electrode 904 through which the welding wire 910 passes. In some examples, the electric arc 916 includes a first arc from the first tungsten electrode 902 to the welding wire 910, and a second arc from the welding wire 910 to the second tungsten electrode 904, or vice versa. The tungsten electrodes 902 and 904 are positioned before the contact tip 914 (i.e., the welding wire 910 is preheated upstream from the contact tip 914).

Figure 10:
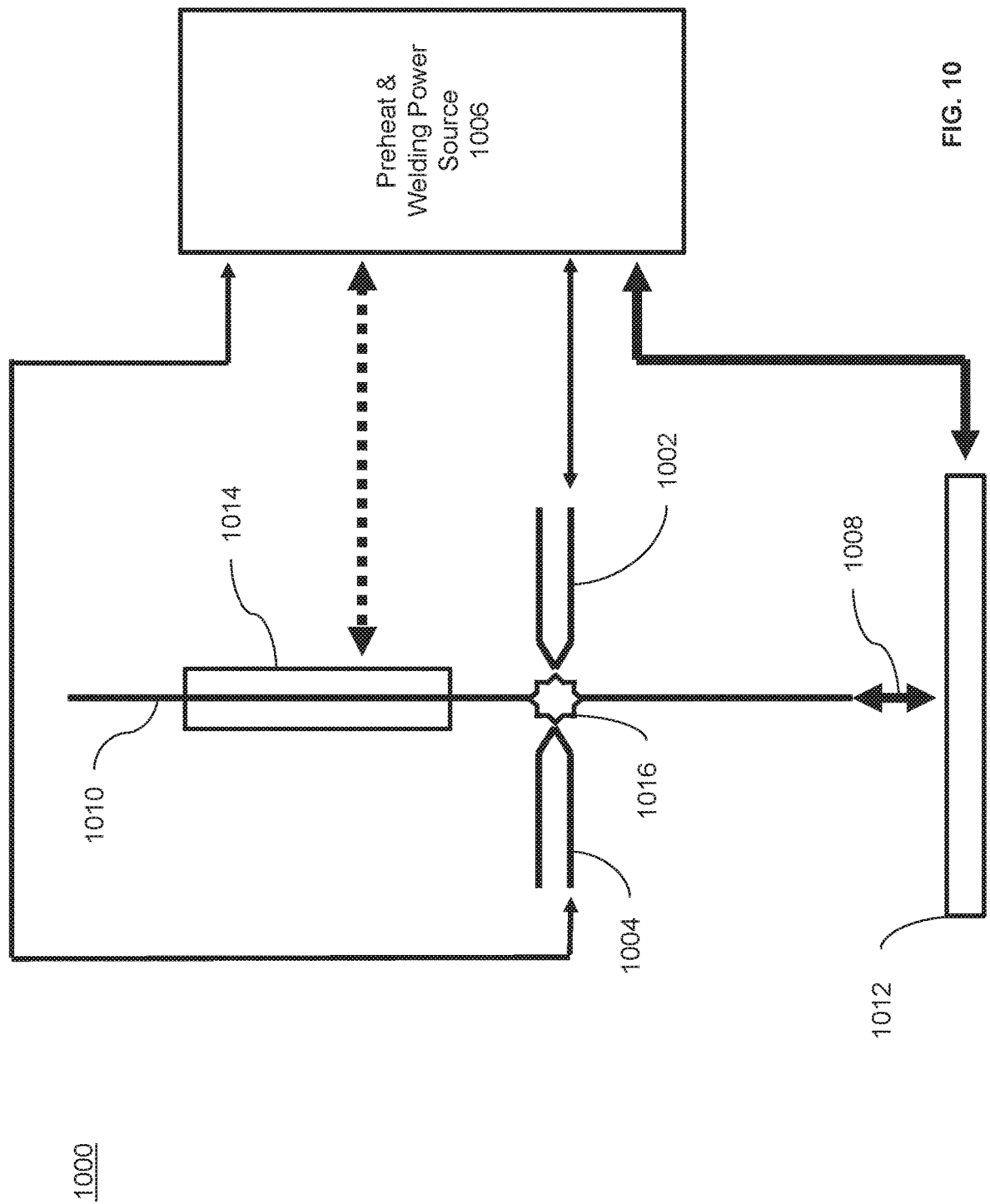
FIG. 10 is a block diagram of an electric arc preheating system, in which an electric arc occurs between two tungsten electrodes downstream of a contact tip, and in which the preheating power source is also a welding power source, in accordance with aspects of this disclosure.

FIG. 10 is a block diagram of an exemplary electric arc preheating system 1000. Preheating system 1000 includes a first tungsten electrode 1002 and a second tungsten electrode 1004. Each tungsten electrode 1002 and 1006 is electrically connected to the preheating power source 1006. The preheating power source 1006 is also a welding power source which provides welding power which provides power for a welding arc 1008 between welding wire 1010 and a workpiece 1012. Welding wire 1010 is fed through a contact tip 1014 and delivered to a workpiece 1012. The contact tip 1014 is connected to the welding power source 1006 in order to provide power for a welding arc 1008 between the welding wire 1010 and the workpiece 1012. The workpiece 1012 is electrically connected to the power source 1006 in order to complete a circuit between the power source 1006, the contact tip 1014, and the welding wire 1010. In some examples, the welding wire 1010 is preheated by an electric arc 1016 between the first tungsten electrode 1002 and the second tungsten electrode 1004 through which the welding wire 1010 passes. In some examples, the electric arc 1016 includes a first arc from the first tungsten electrode 1002 to the welding wire 1010, and a second arc from the welding wire 910 to the second tungsten electrode 1004, or vice versa. The tungsten electrodes 1002 and 1004 are positioned after the contact tip 1014 (i.e., the welding wire 1010 is preheated downstream from the contact tip 1014).

Figure 11:
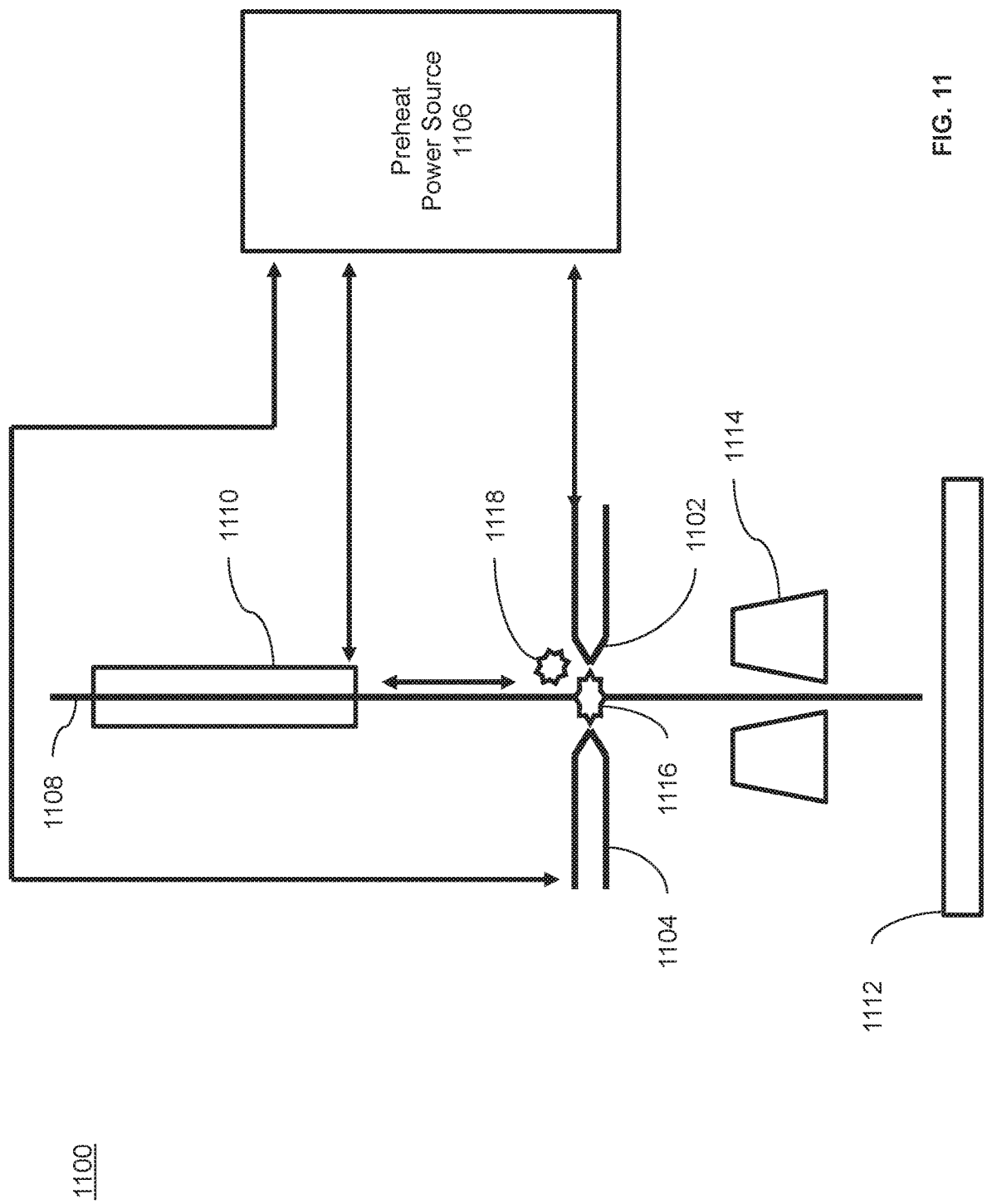
FIG. 11 is a block diagram of an electric arc preheating system, in which a first electric arc occurs between two tungsten electrodes and a second electric arc occurs between one of the two tungsten electrodes and a wire, and in which current flows through a wire between the second electric arc and a contact tip, in accordance with aspects of this disclosure.

FIG. 11 is a diagram of an exemplary electric arc preheating system 1100. Preheating system 1100 includes a first tungsten electrode 1102 and a second tungsten electrode 1104. Each tungsten electrode 1102 and 1104 is electrically connected to the preheating power source 1106. Welding wire 1108 is fed through a contact tip 1110 and delivered to a workpiece 1112 via a wire guide 1114. The contact tip 1110 is electrically connected to the power source 1106 in order to complete a circuit between the power source 1106, the first tungsten electrode 1102, and the welding wire 1108. The welding wire 1108 is preheated by a first electric arc 1116 between the first tungsten electrode 1102 and the second tungsten electrode 1104, and by a secondary electric arc 1118 between the first tungsten electrode 1102 and the welding wire 1108. In some examples, the first electric arc 1116 includes a first arc from the first tungsten electrode 1102 to the welding wire 1108, and a second arc from the welding wire 1108 to the second tungsten electrode 1104, or vice versa. The tungsten electrodes 1102 and 1104 are positioned between the contact tip 1110 and the wire guide 1114. As explained in relation to FIGS. 2a and 2b, the electric arcs 1116 and 1118 may occur inside of a chamber or region filled with shielding gas in order to prevent oxidation of the welding wire 1108.

Figure 12:
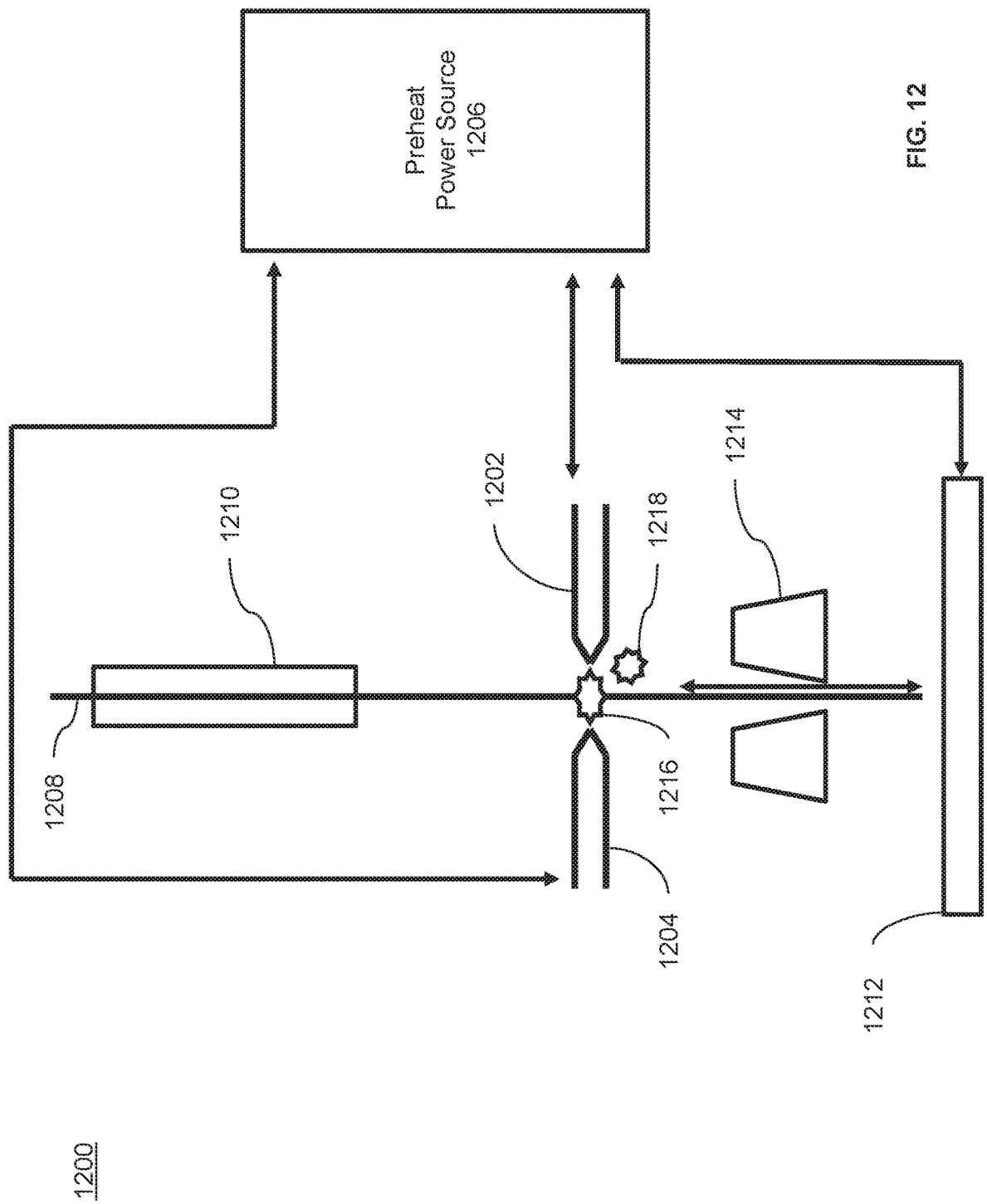
FIG. 12 is a block diagram of an electric arc preheating system, in which a first electric arc occurs between two tungsten electrodes and a second electric arc occurs between one of the two tungsten electrodes and a wire, and in which current flows through a wire between the second electric arc and a workpiece, in accordance with aspects of this disclosure.

FIG. 12 is a block diagram of an exemplary electric arc preheating system 1200. Preheating system 1200 includes a first tungsten electrode 1202 and a second tungsten electrode 1204. Each tungsten electrode 1202 and 1204 is electrically connected to the preheating power source 1206. Welding wire 1208 is fed through a contact tip 1210 and delivered to a workpiece 1212 via a wire guide 1214. The workpiece 1212 is electrically connected to the power source 1206 in order to complete a circuit between the power source 1206, the first tungsten electrode 1202, and the welding wire 1208. The welding wire 1208 is preheated by a first electric arc 1216 between the first tungsten electrode 1202 and the second tungsten electrode 1204, and by a secondary electric arc 1218 between the first tungsten electrode 1202 and the welding wire 1208. In some examples, the first electric arc 1216 includes a first arc from the first tungsten electrode 1202 to the welding wire 1208, and a second arc from the welding wire 1208 to the second tungsten electrode 1204, or vice versa. The tungsten electrodes 1202 and 1204 are positioned between the contact tip 1210 and the wire guide 1214. As explained in relation to FIGS. 2a and 2b, the electric arcs 1216 and 1218 may occur inside of a chamber or region filled with shielding gas in order to prevent oxidation of the welding wire 1208.

Figure 13:
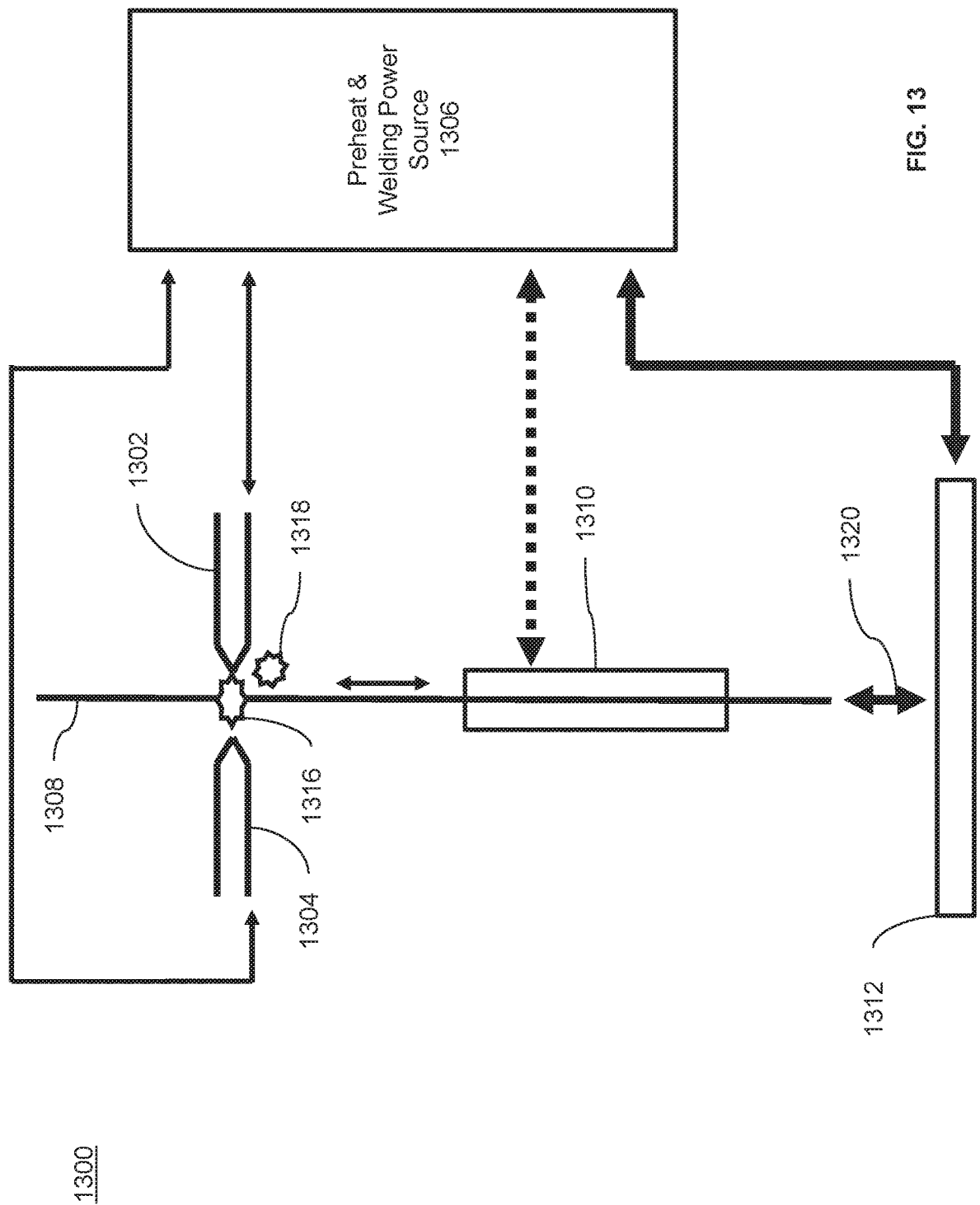
FIG. 13 is a block diagram of an electric arc preheating system, in which a first electric arc occurs between two tungsten electrodes and a second electric arc occurs between a one of the two tungsten electrodes and a wire, and in which current flows through a wire between the second electric arc and a workpiece, and in which the electric arcs are upstream of a contact tip, in accordance with aspects of this disclosure.

FIG. 13 is a block diagram of an exemplary electric arc preheating system 1300. Preheating system 1300 includes a first tungsten electrode 1302 and a second tungsten electrode 1304. Each tungsten electrode 1302 and 1306 is electrically connected to the preheating power source 1306. The preheating power source 1306 is also a welding power source which provides welding power which provides power for a welding arc 1320 between welding wire 1308 and a workpiece 1312. Welding wire 1308 is fed through a contact tip 1310 and delivered to a workpiece 1312. The contact tip 1310 is connected to the welding power source 1306 in order to provide power for a welding arc 1320 between the welding wire 1308 and the workpiece 1312. The workpiece 1312 is electrically connected to the power source 1306 in order to complete the circuits between: 1) the power source 1006, the contact tip 1014, and the welding wire 1010; and 2) the power source 1306, the first tungsten electrode 1302, and the welding wire 1308. The welding wire 1308 is preheated by a first electric arc 1316 between the first tungsten electrode 1302 and the second tungsten electrode 1304, and by a secondary electric arc 1318 between the first tungsten electrode 1302 and the welding wire 1308. In some examples, the first electric arc 1316 includes a first arc from the first tungsten electrode 1302 to the welding wire 1308, and a second arc from the welding wire 1308 to the second tungsten electrode 1304, or vice versa. The tungsten electrodes 1302 and 1304 are positioned before the contact tip 1310 (i.e., the welding wire 1308 is preheated upstream from the contact tip 1310).

FIGS. 14 through 21 illustrate views of the positioning of the preheating tungsten electrode(s) of the present disclosure. FIG. 14 a shows a front view of a preheating system 1400. A single tungsten electrode 1402 is configured to preheat a welding wire 1404.

FIG. 15 shows a front view of a preheating system 1500 using two preheating tungsten electrodes. A first tungsten electrode 1502 and a second tungsten electrode 1504 are configured to preheat a welding wire 1506. The first tungsten electrode 1502 and the second tungsten electrode 1504 are offset circumferentially (i.e. by 180 degrees) so as to evenly preheat the welding wire 1506, as well as to clean both sides of an aluminum welding wire 1506.

FIG. 16 shows a front view of a preheating system 1600 using three preheating tungsten electrodes. A first tungsten electrode 1602, a second tungsten electrode 1604, and a third tungsten electrode 1606 are configured to preheat a welding wire 1608. The first tungsten electrode 1602, the second tungsten electrode 1604, and the third tungsten electrode 1606 are offset circumferentially (i.e. by 120 degrees) so as to evenly preheat the welding wire 1608, as well as to evenly clean an aluminum welding wire 1608. Preheating arcs may occur between the three tungsten electrodes 1602, 1604, and 1606, or preheating arcs may occur between the three tungsten electrodes and the welding wire 1608.

FIG. 17 shows a front view of a preheating system 1700 using four preheating tungsten electrodes. A first tungsten electrode 1702, a second tungsten electrode 1704, a third tungsten electrode 1706, and a fourth tungsten electrode 1708 are configured to preheat a welding wire 1710. The first tungsten electrode 1704, the second tungsten electrode 1704, the third tungsten electrode 1706, and the fourth tungsten electrode 1708 are offset circumferentially (i.e. by 90 degrees) so as to evenly preheat the welding wire 1710, as well as to evenly clean an aluminum welding wire 1710. Preheating arcs may occur between the four tungsten electrodes 1702, 1704, and 1706, and 1708 or preheating arcs may occur between the four tungsten electrodes and the welding wire 1710.

Figure 18:
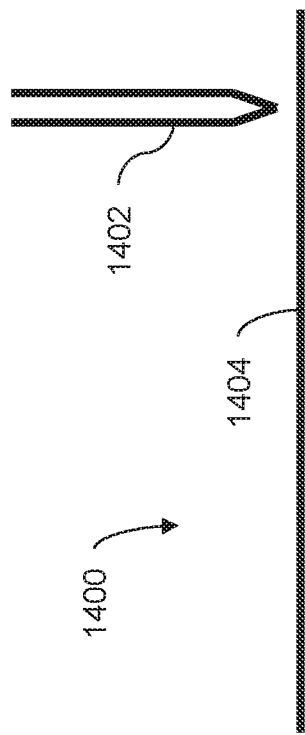
FIG. 18 is a side view of the example electric arc preheating system of FIG. 14 including a single tungsten electrode.
Figure 20:
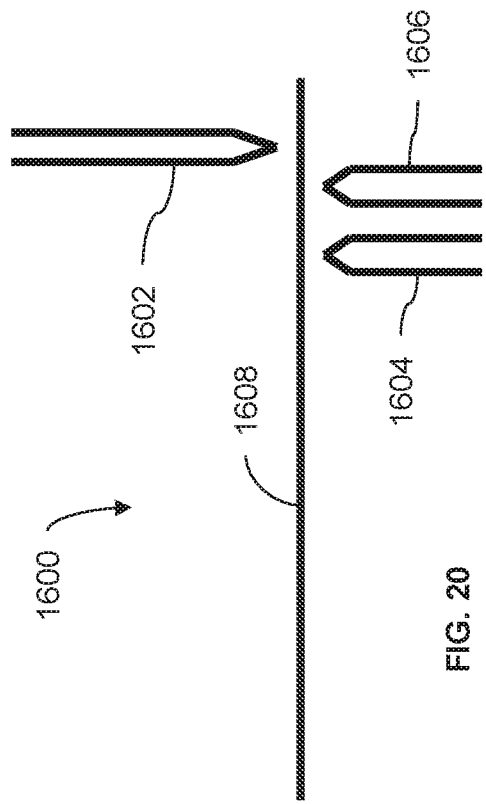
FIG. 20 is a side view of the example electric arc preheating system of FIG. 16 including three tungsten electrodes.
Figure 19:
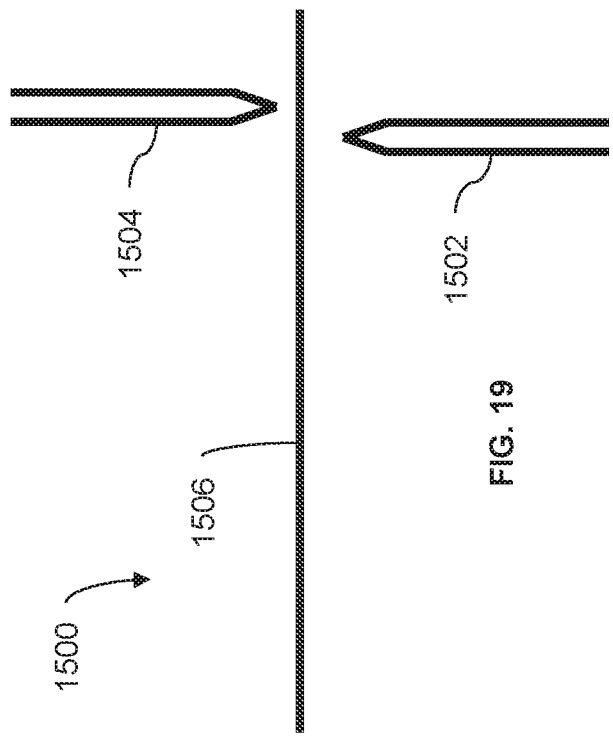
FIG. 19 is a side view of the example electric arc preheating system of FIG. 15 including two tungsten electrodes.
Figure 21:
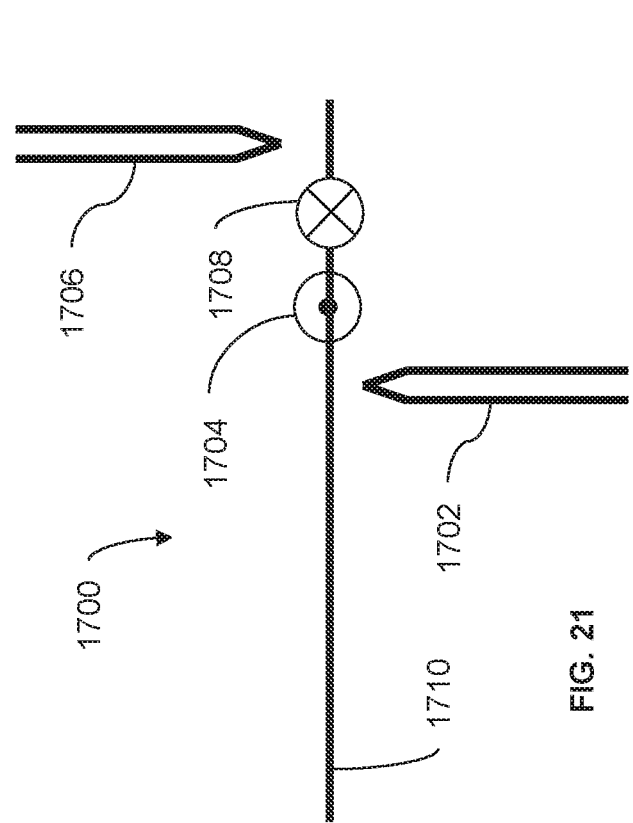
FIG. 21 is a side view of the example electric arc preheating system of FIG. 17 including four tungsten electrodes.

FIG. 18 provides a side view of the preheating system 1400 of FIG. 14. FIG. 19 provides a side view of the preheating system 1500 of FIG. 15. FIG. 20 provides a side view of the preheating system 1600 of FIG. 16. FIG. 21 provides a side view of the preheating system 1700 of FIG. 17. As illustrated in FIGS. 19-21, multiple tungsten electrodes may be offset along the length of the welding wire to cause the resulting preheating arcs to extend between the electrodes and the wire, instead of between the electrodes. Alternatively, that are on opposite sides of the electrode (e.g., about the circumference of the welding wire) may be aligned along the length of the welding wire to cause the preheating arc to extend between the electrodes such that the welding wire passes through the preheating arc(s).

Welding-type power supply and welding power source, as used herein, refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

Welding operation, as used herein, includes both actual welds (e.g., resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An apparatus for preheating welding wire, the apparatus comprising:
   a first tungsten electrode and a second tungsten electrode configured to preheat welding wire via electric arc preheating to the wire prior to delivery of the welding wire to a welding arc.

2. The apparatus of claim 1, wherein the first tungsten electrode is offset circumferentially from the second tungsten electrode, and wherein welding wire is fed between the first tungsten electrode and the second tungsten electrode.

3. The apparatus of claim 1, wherein the electric arc preheating comprises generating the electric arc between the first tungsten electrode and the second tungsten electrode.

4. The apparatus of claim 3, wherein the electric arc between the first tungsten electrode and the second tungsten electrode is an alternating current electric arc.

5. The apparatus of claim 1, wherein electric arc preheating comprises:
   a first electric arc between the first tungsten electrode and the welding wire; and
   a second electric arc between the second tungsten electrode and the welding wire.

6. The apparatus of claim 5, further comprising a contact tip electrically connected to the welding wire, and wherein the contact tip is electrically connected to a preheating power source.

7. The apparatus of claim 6, wherein both the first tungsten electrode and the second tungsten electrode have a positive polarity with respect to the welding wire.

8. The apparatus of claim 7, further comprising a first region comprising shielding gas, wherein the electric arc preheating occurs within the first region.

9. The apparatus of claim 8, further comprising:
   a wire guide configured to deliver preheated welding wire from the first region to a workpiece; and
   a gas diffuser configured to diffuse the shielding gas around the preheated welding wire delivered to the workpiece.

10. The apparatus of claim 5, further comprising a nozzle configured to diffuse shielding gas around the preheated welding wire.

11. A system for preheating welding wire, the system comprising:
    a power source;
    a first tungsten electrode electrically connected to the power source; and
    a second tungsten electrode electrically connected to the power source;
    wherein the first tungsten electrode and the second tungsten electrode are configured to generate an electric arc through which a welding wire travels to thereby preheat the welding wire via the electric arc.

12. The system of claim 11, wherein the first tungsten electrode is offset circumferentially from the second tungsten electrode, and wherein welding wire is fed between the first tungsten electrode and the second tungsten electrode.

13. The system of claim 11, wherein the electric arc between the first tungsten electrode and the second tungsten electrode is an alternating current electric arc.

14. The system of claim 11, further comprising a first region comprising shielding gas, wherein the electric arc preheating occurs within the first region.

15. A system for preheating welding wire, the system comprising:
    a first power source;
    a second power source;
    a first tungsten electrode electrically connected to the first power source and configured to generate a first electric arc from the first tungsten electrode to a welding wire, wherein the welding wire is connected to the first power source; and a second tungsten electrode electrically connected to the second power source and configured to generate a second electric arc from the first tungsten electrode to the welding wire, wherein the welding wire is connected to the second power source;

wherein the first tungsten electrode and the second tungsten electrode are configured to preheat welding wire via the first electric arc and the second electric arc.

16. The system of claim 15, wherein electric arc preheating comprises:

a first electric arc between the first tungsten electrode and the welding wire; and a second electric arc between the second tungsten electrode and the welding wire.

17. The system of claim 16, further comprising a contact tip electrically connected to the welding wire, wherein the contact tip is electrically connected to the first power source and the second power source.

18. The apparatus of claim 17, wherein the first power source provides positive direct current power to the first tungsten electrode, and the second power source provides positive direct current power to the second tungsten electrode.

19. The system of claim 18, further comprising a first region comprising shielding gas, wherein the electric arc preheating occurs within the first region.

* * * * *